(12) United States Patent
Huang et al.

(10) Patent No.: US 6,510,394 B2
(45) Date of Patent: Jan. 21, 2003

(54) CHARGE PUMP WITH SWITCHED CAPACITOR FEEDBACK

(75) Inventors: Congzhong Huang, Plano, TX (US); Fredrick W. Trafton, Lewisville, TX (US); Kirk D. Peterson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 164 days.

(21) Appl. No.: 09/776,312

(22) Filed: Feb. 2, 2001

(65) Prior Publication Data

US 2002/0107646 A1 Aug. 8, 2002

(51) Int. Cl.$^7$ .............................. G01R 27/00; G05F 1/10
(52) U.S. Cl. .............................. 702/65; 702/57; 702/64; 327/536; 327/537
(58) Field of Search .............................. 702/57, 62, 65, 702/64, 182; 327/536, 537, 538; 363/59, 60; 365/226–228

(56) References Cited

U.S. PATENT DOCUMENTS

| 4,481,566 A | * 11/1984 | Hoffman et al. .............. 363/60 |
| 4,752,699 A | 6/1988 | Cranford, Jr. et al. |
| 5,828,095 A | 10/1998 | Merritt |
| 5,986,935 A | * 11/1999 | Iyama et al. ........... 365/185.18 |
| 6,043,716 A | 3/2000 | Warner |
| 6,107,862 A | 8/2000 | Mukainakano et al. |

* cited by examiner

Primary Examiner—Bryan Bui
(74) Attorney, Agent, or Firm—W. Daniel Swayze, Jr.; W. James Brady; Frederick J. Telecky, Jr.

(57) ABSTRACT

A system and method is provided for monitoring a voltage level of a charge pump device. The system and method employ a first charging device that is coupled to an output of a charge pump through a switching system. The first charging device is then decoupled from the output of the charge pump device and coupled to a second charging device. The charge on the first charging device is then redistributed between the first charging device and the second charging device. The output of the second charging device is a reduced voltage (e.g., below 5 volts) based on the ratio of the charge distribution between the first and second charging devices. The output of the second charging device can then be compared to a reference voltage to determine if the voltage of the charge pump device is at an adequate voltage level.

28 Claims, 5 Drawing Sheets

CHARGE PUMP WITH SWITCHED CAPACITOR FEEDBACK

TECHNICAL FIELD

The present invention relates to electrical circuits, and more particularly to a system and method for providing an improved charge pump monitor for maintaining a charge pump voltage at a particular voltage.

BACKGROUND OF THE INVENTION

System designs are routinely constrained by a limited number of available power supply voltages. For example, a portable computer system powered by a conventional battery has a limited power supply voltage. Many components (e.g., non-volatile memory) require power to be supplied at operating voltages of a greater magnitude than the power supply voltage available. Therefore, designs have evolved in power conversion circuitry to efficiently develop the required operating voltages. One such power conversion circuit is known as a charge pump. The demand for highly efficient and reliable charge pump circuits has increased with an increasing number of applications using battery power such as notebook computers, portable telephones, battery backup data storage, remote controls and a variety of portable instrumentation devices.

Inefficiencies in conventional charge pumps lead to reduced system capability and lower system performance in both battery and non-battery operating systems. Inefficiency can adversely affect system capabilities, e.g., limited battery life, excess heat generation, and high operating costs. Charge pump monitor circuits are employed to ensure efficient operation and adequate voltage amplitudes required for charge pump circuits. However, the charge pump monitor circuits also require power, thus reducing the efficiency of the system. Furthermore, the charge pump monitor circuits periodically load the charge pump circuit to determine the amplitude level of the charge pump, so that the charge pump circuit can be efficiently charged to the appropiate voltage level. This periodic loading also has a deleterious effect on the power usage of the system.

FIG. 1 illustrates a prior art system employing a conventional charge pump monitoring system 20. The charge pump monitoring system is electrically coupled to a charge pump 10 and a control system 12. The charge pump monitoring system 20 includes a switch 22, a comparator device 30 and a voltage divider circuit 24. The voltage divider circuit 24 includes a first resistor and a second resistor 28. During normal operation, the control system 12 periodically closes the switch 22, which causes the output of the charge pump 10 to be coupled to the voltage divider circuit 24. The voltage of the charge pump 10 is reduced by the voltage divider, so that it can be input into the comparator device that operates at a reduced voltage (e.g., 5 volts). The reduced voltage is then compared to a reference voltage by the comparator device 30. If the reduced voltage is not at an appropriate level, meaning that the charge pump is not at an appropriate level, a signal is sent to the control system 12 from the comparator device 30. The control system 12 then charges the charge pump 10 until it reaches the appropriate voltage level. Once the charge pump 10 reaches the appropriate level, the switch 22 is opened by the control system 12, thereby disconnecting the monitoring system 20 from the charge pump 10.

The above methodology is repeated continuously so that the charge pump maintains an appropriate amplitude level. However, the voltage divider draws relatively large amounts of current from the charge pump resulting in inefficiencies in the system. Large resistors may be utilized to reduce the current draw, however, large resistors are expensive and impractical in small integrated circuits. In view of the above, it is apparent that there is an unmet need for improvements in charge pump monitors in a system employing a charge pump.

SUMMARY OF THE INVENTION

A system and method is provided for monitoring a voltage level of a charge pump device. The system and method employ a first charging device that is coupled to an output of a charge pump through a switching system. The first charging device utilizes a minimal amount of charge from the charge pump device to charge to a first voltage level. The first charging device is then decoupled from the output of the charge pump device and coupled to a second charging device. The charge on the first charging device is then redistributed between the first charging device and the second charging device. The output of the second charging device is at a second or reduced voltage level (e.g., below 5 volts) based on the ratio of the charge distribution between the first and second charging devices. The output of the second charging device can then be compared to a reference voltage to determine if the voltage of the charge pump device is at an appropriate voltage level. If the voltage level of the charge pump device is not at an appropriate voltage level. The charge pump device is charged or discharged as necessary.

In one aspect of the invention, a charge pump monitor circuit is provided utilizing a first capacitor and a second capacitor for reducing the voltage level associated with the charge pump below a 5 volt level. The first capacitor is coupled to an output of a charge pump through a first switch (e.g., a transistor). The first capacitor is selected to be of a relatively small capacitance, such that the first capacitor utilizes a minimal amount of current from the charge pump device to charge the first capacitor to a first voltage level. The first switch is then opened decoupling the first capacitor from the output of the charge pump device. A second switch (e.g., a transistor) is closed coupling the first capacitor to a second capacitor. The charge on the first capacitor is then redistributed between the first capacitor and the second capacitor. The output of the second capacitor is at a second or reduced voltage level or the first voltage level based on the ratio of the charge distribution between the first and second capacitors. The second capacitor is selected to have a higher capacitance than the first capacitor, such that the voltage across the second capacitor is smaller than the voltage across the first capacitor after the charge redistribution. The output of the second capacitor can then be compared to a reference voltage to determine if the voltage of the charge pump device is at an appropriate voltage level. If the voltage level of the charge pump device is not at an appropriate voltage level, the charge pump device is charged up to the appropriate voltage level. Logic circuitry can be employed so that monitoring and sampling of the charge pump device can be invoked periodically based on a clock cycle.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention, when considered in conjunction with the drawings.

DETAILED DESCRIPTION OF THE INVENTION

The present invention will now be described with respect to the accompanying drawings in which like numbered elements represent like parts. The present invention will be described with reference to a circuit and a method of providing a charge pump monitor in a system employing a charge pump. The present invention includes first and second charging devices employed to facilitate determination of a voltage amplitude level of a charge pump, so that an appropriate charge pump voltage amplitude level can be maintained. The charge pump monitor of the present invention draws a minimal amount of current compared to conventional charge pump monitoring devices. It should be understood that the description below is merely illustrative and should not be construed in a limiting sense.

Figure 1:
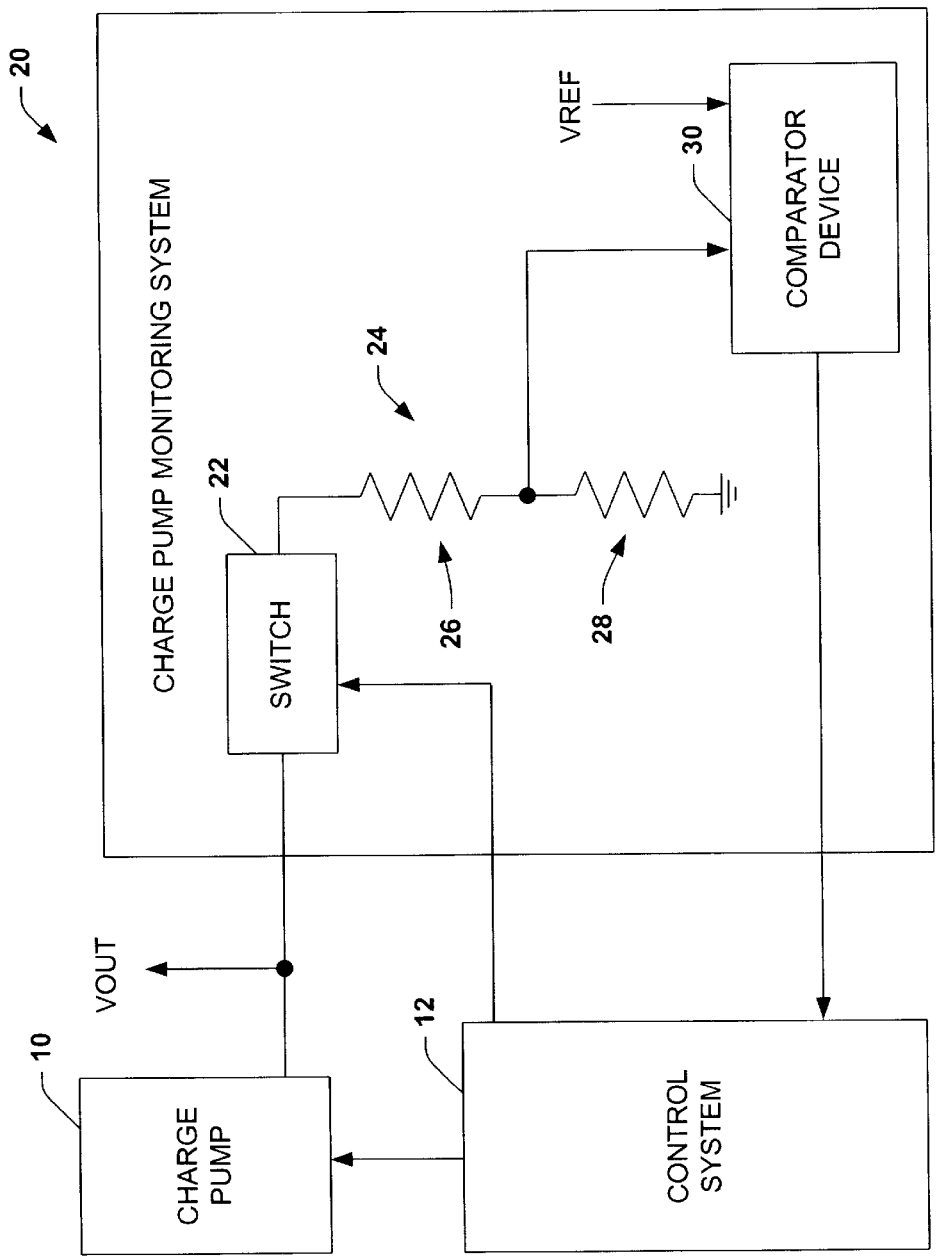
FIG. 1 illustrates a schematic block diagram of a charge pump monitoring system in accordance with the prior art.
Figure 2:
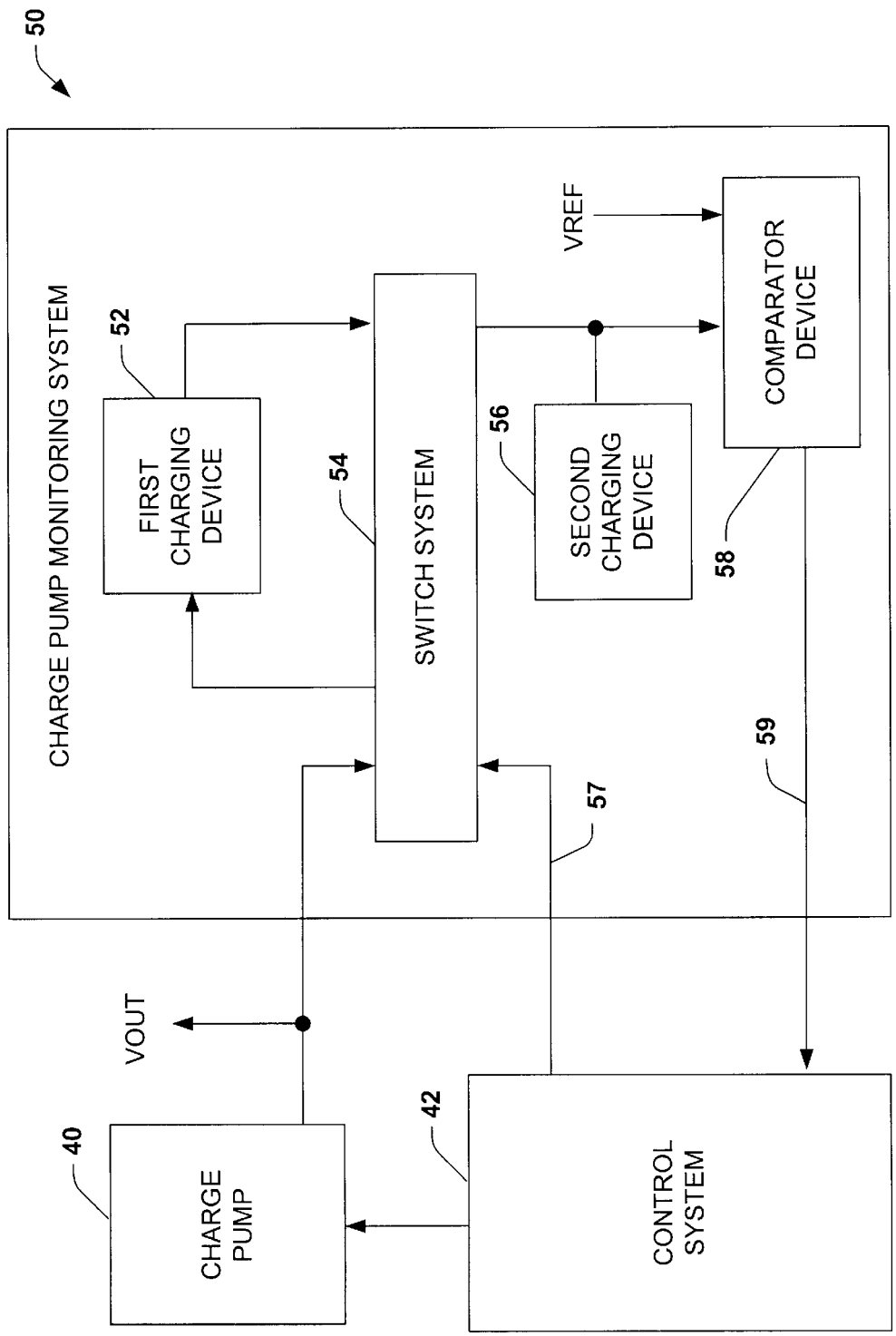
FIG. 2 illustrates a schematic block diagram of a charge pump monitoring system in accordance with one aspect of the present invention.

FIG. 2 illustrates a charge pump system employing a charge pump monitoring system 50 according to one aspect of the invention. The charge pump monitoring system 50 is electrically coupled to a charge pump 40 and a control system 42. The charge pump monitoring system 50 includes a first charging device 52, a second charging device 56, a switch system 54 and a comparator device 58. During normal operation, the control system 42 periodically transmits a control signal 57 to the switch system 54. The switch system 54 then couples the output of the charge pump 40 (Vout) to the first charging device 52.

After a predetermined amount of time, the first charging device charges up to a potential which is substantially equivalent to that of the charge pump 40. The switching system 54 then decouples the output of the charge pump 40 from the first charging device 52. The switching system 54 then couples the first charge device 52 to the second charging device 56 to reduce the voltage for comparison to a reference voltage (Vref) by the comparator device 58, which operates at a reduced voltage level (e.g., 5 volts). The first charging device 52 then charges the second charging device 56 (e.g., due to charge redistribution). Once the charge levels have settled between the two charging devices, the reduced voltage at the second charging device 56 is compared to a reference voltage by the comparator device 58. If the reduced voltage is not at an appropriate voltage level, meaning that the charge pump is not at an appropriate level (e.g., +/−5% of a desired voltage level), a signal 59 is sent to the control system 42 from the comparator device 58. The control system 42 then charges the charge pump 40 until it reaches an appropriate level (e.g., +/−5% of a desired voltage level).

Figure 3:
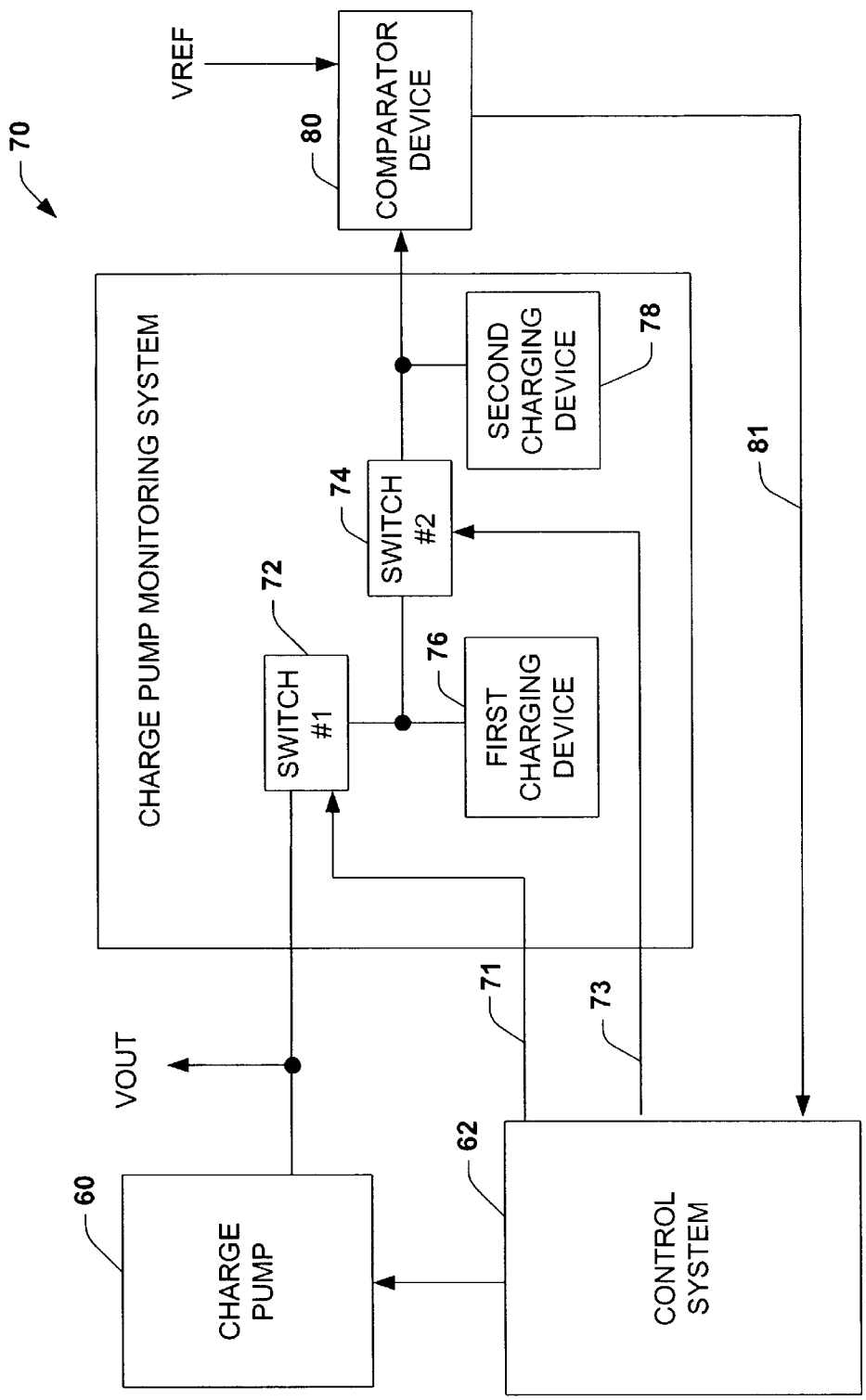
FIG. 3 illustrates a schematic block diagram of a charge pump monitoring system in accordance with another aspect of the present invention.

FIG. 3 illustrates a charge pump system employing a charge pump monitoring system 70 according to another aspect of the invention. The charge pump monitoring system 70 is electrically coupled to a charge pump 60 and a control system 62. The charge pump monitoring system 70 includes a first charging device 76, a second charging device 78, a first switch 72 and a second switch 74. During normal operation, the control system 62 periodically closes the first switch 72 via a signal 71, thereby coupling the output of the charge pump 60 (Vout) to the first charging device 76.

After a predetermined amount of time, the first charging device charges up to a first voltage level, which could be substantially equivalent to that of the charge pump 60 or at a first reduced voltage level. The control system 62 then opens the first switch 72 and closes the second switch 74 via a signal 73, thereby coupling the first charging device 76 to the second charging device 78. The second charging device 78 reduces the voltage at the first charging device 76 for comparison to a reference voltage (VREF) by a comparator device 80 operating at a reduced voltage level (e.g., 5 volts). For example, the first charging device 76 charges the second charging device 78. Once the charge levels have settled between the two charging devices, the second or reduced voltage at the second charging device 78 is compared to a reference voltage by the comparator device 80. If the second, reduced voltage is not at an appropriate level, meaning that the charge pump 60 is not at an appropriate level, a signal 81 is sent to the control system 62 from the comparator device 80. Alternatively, the control system 62 can periodically poll the output of the comparator 80 or the output 81 of the comparator 80 can be configured as an interrupt to the control system 62. The control system 62 then charges the charge pump 60 until it reaches the appropriate level.

Figure 4:
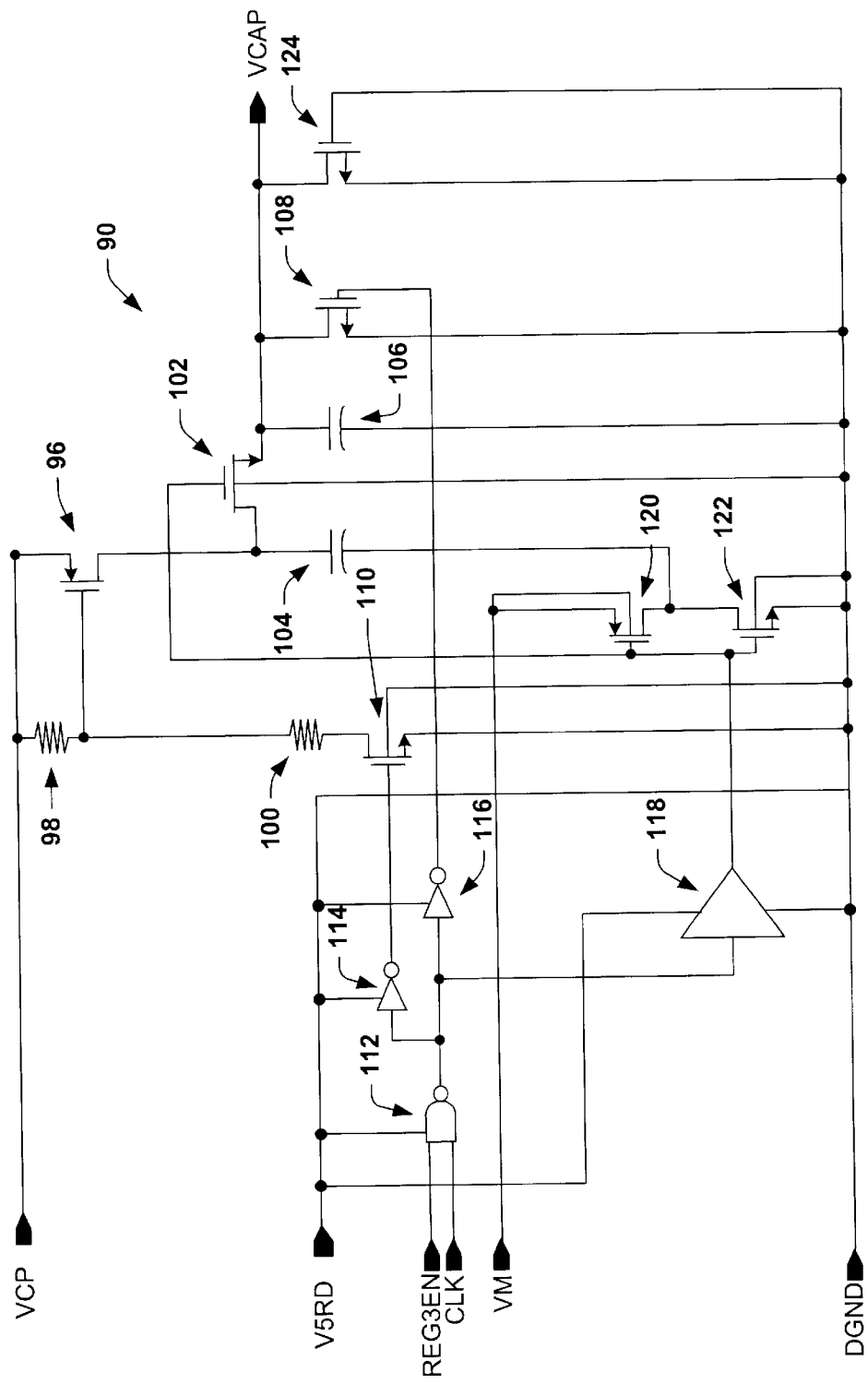
FIG. 4 illustrates a schematic diagram of a charge pump monitoring circuit in accordance with another aspect of the present invention.

FIG. 4 illustrates an exemplary charge monitoring circuit 90 according to yet another aspect of the invention. The charge monitoring circuit 90 includes a plurality of input pins and a single output pin. The plurality of input pins includes an input pin (VCP) operable to be coupled to the output of a charge pump, a five volt read signal (V5RD) for providing power to the logic circuitry of the charge monitoring circuit 90, an input clock signal (CLK) for periodic monitoring of the charge pump, a monitor voltage signal (VM), a charge regulation enable signal (REG3EN) and a ground signal (DGND). The output pin (VCAP) is a reduced voltage of the charge monitor voltage, so that the reduced voltage can be compared to a reference voltage of a comparator circuit or the like operating at 5 volts, for example.

The VCP input pin is coupled to a resistor 98 and a first PMOS transistor 96. The resistor 98 is also coupled to a resistor 100 and a first NMOS transistor 110 coupled to logic circuitry. The logic circuitry includes a NAND gate 112, a first inverter 114 and a second inverter 116. The logic circuitry provides a first mode where the output voltage of the charge pump is coupled to a first capacitor 104, and a second mode where the output voltage of the charge pump is decoupled from the first capacitor 104, and the first capacitor 104 is coupled to a second capacitor 106. The PMOS transistor 96 is coupled to the first capacitor 104 and a second NMOS transistor 102. The first capacitor 104 is also connected to a second PMOS transistor 120, which is coupled to a third NMOS transistor 122. A buffer 118 receives a signal from the NAND gate 112 and provides a control signal to the second PMOS transistor 120 and the third NMOS transistor 122 for switching between the first and second mode. The second NMOS transistor 102 is also coupled to the second capacitor 106 and a fourth and fifth NMOS transistor 108 and 124, respectively.

An exemplary methodology of how the charge pump monitor circuit 90 can operate will now be discussed with respect to one particular desired voltage charge pump level. The present example will be illustrated with respect to a charge pump device that needs to maintain a voltage level of 27 volts, with a supply voltage of 12 volts at the VM pin. In a first mode, a high signal is applied to the REG3EN input signal and the input CLK signal pin receives a clock signal of approximately 300 KHz. On the first half or rising portion of the clock signal, the first NMOS transistor 110 turns on causing the first PMOS transistor 96 to turn on, such that the charge pump voltage of approximately 27 volts is applied across a first side of the first capacitor 104. The fourth NMOS transistor 108 also turns on, thereby grounding the output signal and shorting out at both ends of the second capacitor 106. The second PMOS transistor 120 is also turned on, thus providing 12 volts from the voltage monitor input signal (between the second PMOS transistor 120 and the third NMOS transistor 122) to be applied across the second side of the first capacitor 104, thereby charging the first capacitor 104 to approximately 15 volts.

During a second half of the clock signal, the first NMOS transistor 110 turns off, causing the first PMOS transistor 96 to turn off. The fourth NMOS transistor 108 also turns off and the third NMOS transistor 122 turns on. The second NMOS transistor 102 also turns on, thereby causing the second NMOS transistor 102 to close, thus applying the voltage of the first capacitor 104 to the second capacitor 106. The charge on the first capacitor 104 is then redistributed between the first capacitor 104 and the second capacitor 106. If the first capacitor 104 has a value of about 1–3 picofarads (e.g., 2 picofarads) and the second capacitor 106 has a value of about 8–12 picofarads (e.g., 10.4 picofarads), the voltage at the input signal of the comparator (not shown) should be about 2.6 volts if the voltage at the charge pump output is about 27 volts.

Since the capacitors are relatively small, they are quickly charged such that the final value of the output signal VCAP will redistribute and settle after about 500 nanoseconds. Therefore, the value of VCAP can then be compared to a reference voltage after 500 nanoseconds into the second half of the clock signal. Furthermore, a 1–3 picofarad capacitor (capacitor 104) can be charged utilizing minimal charge (and thus minimal current draw) from the charge pump. If the value of VCAP is too low (upon a subsequent comparison with a reference voltage), the charge pump is charged according to conventional techniques. The monitoring continues for every clock pulse. It is to be appreciated that various other timing methodologies may be employed to the input signals CLK, REG3EN and the V5RD to provide appropriate monitoring of a charge pump in accordance with the present invention.

Figure 5:
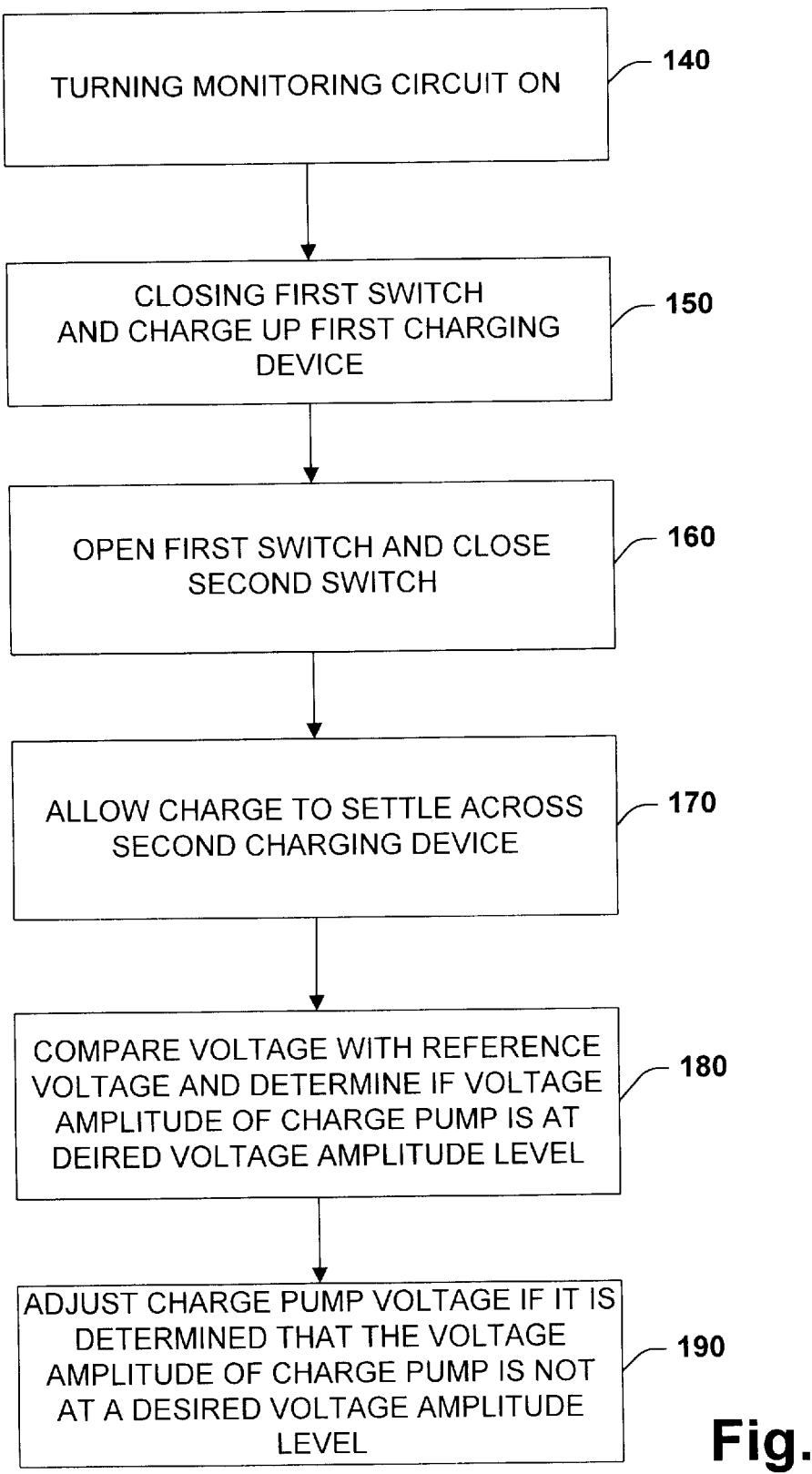
FIG. 5 illustrates a flow chart of one particular methodology of monitoring a charge pump voltage level in accordance with one aspect of the present invention.

FIG. 5 is a flow diagram representing a charge pump monitoring methodology utilizing a first and a second charging device, for example, as illustrated in FIGS. 2–4. While, for purposes of simplicity of explanation, the methodology of FIG. 5 is shown and described as a series of steps, it is to be understood and appreciated that the present invention is not limited to the order of steps, as some steps may, in accordance with the present invention, occur in different orders and/or concurrently with other steps from that shown and described herein. For example, a methodology in accordance with an aspect of the present invention may be represented as a combination of various states (e.g., in a state diagram). Moreover, not all illustrated steps may be required to implement a methodology in accordance with an aspect the present invention.

FIG. 5 is a flow diagram illustrating one particular methodology of charge pump monitoring in accordance with the present invention. At step 140, the charge pump monitoring circuit is turned on. At step 150, a first switch is closed, thereby coupling the output of the charge pump to the first charging device and charging the first charging device to the potential of the output of the charge pump or some predetermined potential level. At step 160, the first switch is opened decoupling the first charging device from the output of the charge monitor. The second switch is closed, thus coupling the first charging device to the second charging device. At step 170, the charge on the first charging device charges up the second charging device and the charge across the first and second charging devices are allowed to settle. The voltage across the second charging device is then compared to a reference voltage to determine if the voltage amplitude of the charge pump is substantially equal to a desired voltage amplitude, at step 180. At step 190, the charge pump voltage is adjusted or not adjusted based on the comparison result.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A charge pump monitoring system, comprising:
   a first charging device;
   a switching system coupled to the first charging device, the switching system further coupled to an output of a charge pump device;
   a second charging device coupled to the switching system, the second charging device being coupled to a comparator device operable to compare a reference voltage to an output of the second charging device; and
   wherein the switching system has a first mode coupling the first charging device to the output of the charge pump device and causing the first charging device to charge to a first voltage level, and the switching system having a second mode decoupling the first charge device from the charge pump device and coupling the first charging device to the second charging device, causing the second charging device to be charged by the first charging device to a second voltage level.

2. The system of claim 1, the switching system comprising a first switch and a second switch.

3. The system of claim 2, the first charging device comprising a first capacitor and the second charging device comprising a second capacitor.

4. The system of claim 3, the first capacitor having a capacitance of about 1–3 picofarads and the second capacitor having a capacitance of about 8–12 picofarads.

5. The system of claim 3, wherein the second voltage level of the second charging device comprises a voltage amplitude proportional to a ratio of the first capacitor and the second capacitor when both the first and second capacitor are charged.

6. The system of claim 5, the second capacitor having a voltage amplitude of less than five volts when charged to the second voltage level for comparing to a reference voltage.

7. The system of claim 6, the output of the second capacitor being coupled to the comparator device for comparing the voltage of the second capacitor to the reference voltage.

8. The system of claim 7, the output of the comparator device being coupled to a control system for charging a charge pump to an appropriate voltage level if a comparator device output state indicates that the charge pump output is below an appropriate charge pump level by the charge pump monitoring system.

9. A charge pump monitoring circuit, comprising:
   a first capacitor;
   a first switch coupled to the first capacitor, the first switch further coupled to an output of a charge pump device, the first switch operable to selectively couple a voltage at the output of the charge pump device to the first capacitor;
   a second switch selectively coupling the first capacitor to a second capacitor, the second capacitor further coupled to a comparator device adapted to compare a reference voltage to a voltage associated with the second capacitor; and
   a logic circuit being adapted to control a state of the first switch and the second switch, respectively.

10. The circuit of claim 9, the logic circuit being operable to close the first switch and open the second switch on a first portion of a clock signal and open the first switch and close the second switch on a second portion of the clock signal.

11. The circuit of claim 10, wherein closing the first switch and opening the second switch couples the first capacitor to the output of the charge pump device, causing the first capacitor to charge to a first voltage level, and wherein opening the first switch and closing the second switch decouples the first capacitor from the charge pump device and couples the first capacitor to the second capacitor, causing the charge on the first capacitor to be redistributed between the first and second capacitors.

12. The circuit of claim 9, the first switch and the second -switch each being one of a NMOS and a PMOS transistor.

13. The circuit of claim 9, the first capacitor having a capacitance of about 1–3 picofarads and the second capacitor having a capacitance of about 8–12 picofarads.

14. The circuit of claim 9, the second capacitor and the first capacitor having a size ratio of approximately 5:1.

15. The circuit of claim 9, the second capacitor having a voltage amplitude of less than five volts when charged for comparing to a reference voltage.

16. The circuit of claim 9, the output of the second capacitor being coupled to a comparator device for comparing the voltage of the second capacitor to a reference voltage.

17. The circuit of claim 16, the output of the comparator device being coupled to a control system for charging a charge pump to an appropriate voltage level if a comparator device output state indicates the charge pump output is below an appropriate charge pump voltage level.

18. A method of monitoring a charge pump, the method comprising:
   coupling an output of a charge pump to a first charging device until the first charging device is charged to a first voltage level;
   coupling the first charging device to a second charging device to redistribute a charge of the first charging device with the second charging device, and to provide a reduced voltage level associated with the first and second charging devices, respectively; and
   comparing the reduced voltage level to a voltage reference to determine if the charge pump is at an appropriate voltage potential.

19. The method of claim 18, the step of coupling the first charging device to a second charging device further comprising decoupling the first charging device from the output of the charge pump.

20. The method of claim 18, further comprising adjusting the charge pump voltage if it is determined that the charge pump is not at an adequate voltage potential.

21. The method of claim 18, further comprising allowing the charge to redistribute across the second charging device prior to the comparing the reduced voltage level to a voltage reference.

22. The method of claim 18, the reduced voltage being below about 5 volts.

23. The method of claim 18, the first charging device being a first capacitor and the second charging device being a second capacitor.

24. The method of claim 23, the first capacitor having a capacitance of about 1–3 picofarads and the second capacitor having a capacitance of about 8–12 picofarads.

25. The method of claim 23, the second capacitor and the first capacitor having a size ratio of approximately 5:1.

26. A system for monitoring a charge pump, the system comprising:
   means for coupling an output of a charge pump to a first charging device until the first charging device is charged to a first voltage level;
   means for coupling the first charging device to a second charging device to redistribute the charge of the first charging device with the second charging device and to provide a reduced voltage level associated with the first and second charging devices, respectively; and
   means for comparing the reduced voltage level to a voltage reference to determine if the charge pump is at an appropriate voltage potential.

27. The system of claim 26, the means for coupling the first charging device to a second charging device further comprising means for decoupling the first charging device from the output of the charge pump.

28. The system of claim 26, further comprising means for adjusting the charge pump voltage if it is determined that the charge pump is not at an appropriate voltage potential.

* * * * *